United States Patent
Moriarty et al.

(10) Patent No.: US 10,869,180 B1
(45) Date of Patent: Dec. 15, 2020

(54) INTELLIGENT ACCIDENT DETECTION SYSTEM

(71) Applicant: Accenture Global Solutions Limited, Dublin (IE)

(72) Inventors: John Moriarty, Dublin (IE); Michael Torrans, Dublin (IE); Emma Louise Sharkey, Dublin (IE); Patrick Raymond Swan, Dublin (IE); Jessica Derby, Dublin (IE); Emer Fitzgerald, Portlaoise (IE); James Edward Maxwell, Oldcastle (IE); Owen McGauley, Wicklow Town (IE); Abhijeet Bhatikar, Dublin (IE); Nils Heyman-Dewitte, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/597,991

(22) Filed: Oct. 10, 2019

(51) Int. Cl.
*H04W 4/90* (2018.01)
*H04W 4/80* (2018.01)
(Continued)

(52) U.S. Cl.
CPC ............... *H04W 4/90* (2018.02); *G06N 5/04* (2013.01); *G06N 20/00* (2019.01); *H04W 4/06* (2013.01); *H04W 4/80* (2018.02); *H04W 88/02* (2013.01)

(58) Field of Classification Search
CPC ......... H04W 4/029; H04W 4/40; H04W 4/90; H04W 4/027; H04W 4/44; H04W 4/46; H04W 72/02; H04W 72/0406; H04W 72/0413; H04W 72/0446; H04W 4/02; H04W 72/0453; H04W 16/14; H04W 24/10; H04W 72/121; H04W 12/00508; H04W 36/08; H04W 4/48; H04W 64/00; H04W 76/50; H04W 84/18; H04W 88/00; H04W 92/18; H04W 28/10; H04W 28/12; H04W 36/0022; H04W 36/14;
(Continued)

(56) References Cited

U.S. PATENT DOCUMENTS

| 9,147,330 B2 | 9/2015 | Johnson, Jr. et al. | |
| 2017/0053461 A1* | 2/2017 | Pal | H04W 4/029 |
| 2019/0190591 A1* | 6/2019 | Wang | H04W 76/15 |

OTHER PUBLICATIONS

Accenture, "Helping Achieve High Performance Safety using Intelligent Industrial Mobility" Accenture Plant and Commercial Services, 2013, 8 pages.
(Continued)

*Primary Examiner* — Kwasi Karikari
(74) *Attorney, Agent, or Firm* — Fish & Richardson P.C.

(57) ABSTRACT

An accident detection system for providing movement data for processing using a ML model executed on a mobile device, the movement data being generated by the mobile device, receiving, from the ML model, a first prediction representative of an occurrence of a first accident, in response to receiving the first prediction, providing a first local alert on the mobile device, and selecting one of a first network and a second network for broadcasting a first remote alert to one or more end-points, if the first network is selected, the first remote alert is broadcast over the first network by the mobile device, and, if the second network is selected, the first remote alert is broadcast over the second network by an alerting module that is in communication with the mobile device.

33 Claims, 6 Drawing Sheets

(51) Int. Cl.
  *G06N 20/00* (2019.01)
  *G06N 5/04* (2006.01)
  *H04W 4/06* (2009.01)
  *H04W 88/02* (2009.01)

(58) Field of Classification Search
  CPC ..... H04W 48/10; H04W 48/18; H04W 48/20; H04W 74/0841; H04W 74/0858; H04W 88/02; H04W 92/10
  See application file for complete search history.

(56) References Cited

OTHER PUBLICATIONS

Guardian24.com [online], "Lone Worker App for Your Smartphone", retrieved on Sep. 6, 2019, retrieved from URL<https://guardian24.co.uk/lone-worker-mobile-solutions/>, 5 pages.

Guardian24.com [online], "MicroGuard Lone Worker Alarm", retrieved on Sep. 6, 2019, retrieved from URL<https://guardian24.co.uk/microguard-device/>, 4 pages.

Guardian24.com [online], "MicroSOS—The World's Smallest Lone Worker Alarm", retrieved on Sep. 6, 2019, retrieved from URL<https://guardian24.co.uk/microsos-lone-worker-alarm/>, 4 pages.

* cited by examiner

US 10,869,180 B1

INTELLIGENT ACCIDENT DETECTION SYSTEM

BACKGROUND

Humans can often be in solitary situations, in which no other humans or communication systems are available. For example, in many industries, lone workers operate in unstructured work environments, where there is little or no regulation and safety systems. Example industries include agriculture, policing, utilities, and healthcare fieldwork. In some circumstances, workers may face hazardous conditions. In the event of an accident, a worker may be unable to communicate with the outside world. For example, the worker may become incapacitated by an accident and be unable to operate a communication device (e.g., cellular phone). As another example, the worker may be in a remote location and out of communication range (e.g., remote from a cellular network).

SUMMARY

Implementations of the present disclosure are generally directed to an intelligent accident detection (IAD) platform for detecting potential occurrences of accidents and dispatching appropriate personnel. More particularly, implementations of the present disclosure are directed to an IAD platform that includes an IAD system having an alerting module that is in communication with a mobile device, the IAD system issuing an alert in response to one of manual or automated activation of the alerting module and detected potential occurrence of an accident based on one or more machine-learning (ML) models.

In some implementations, actions include providing movement data for processing using a ML model executed on a mobile device, the movement data being generated by the mobile device, receiving, from the ML model, a first prediction representative of an occurrence of a first accident, in response to receiving the first prediction, providing a first local alert on the mobile device, and selecting one of a first network and a second network for broadcasting a first remote alert to one or more end-points, if the first network is selected, the first remote alert is broadcast over the first network by the mobile device, and, if the second network is selected, the first remote alert is broadcast over the second network by an alerting module that is in communication with the mobile device. Other implementations of this aspect include corresponding systems, apparatus, and computer programs, configured to perform operations and actions of methods, encoded on computer storage devices.

These and other implementations can each optionally include one or more of the following features: the second network is selected in response to determining that the mobile device is not connected to the first network; the first network includes a cellular communication network; the second network includes a network using narrow band Internet-of-Things (NB-IOT) technology; the alerting module is mounted to a mobile device case that encases the mobile device; the mobile device case includes a battery for charging the alerting module; selecting one of a first network and a second network is performed in response to determining that an alert is not cancelled before expiration of a countdown; actions further include receiving, from the ML model, a second prediction representative of a non-occurrence of an accident, receiving, from the alerting module, a signal indicating manual triggering of an alert, and at least partially in response to receiving the signal, selecting one of a first network and a second network for broadcasting a second remote alert to the one or more end-points, if the first network is selected, the second remote alert is broadcast over the first network by the mobile device, and, if the second network is selected, the second remote alert is broadcast over the second network by the alerting module; actions further include receiving, by the mobile device, an updated ML model, the updated ML model being at least partially provided based on feedback data received from the mobile device; the alerting module is in communication with the mobile device using a Bluetooth connection; and the movement data includes one or more of location data, accelerometer data, and gyroscope data.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

BRIEF DESCRIPTION OF DRAWINGS

Like reference numbers and designations in the various drawings indicate like elements.

DETAILED DESCRIPTION

Figure 1B:
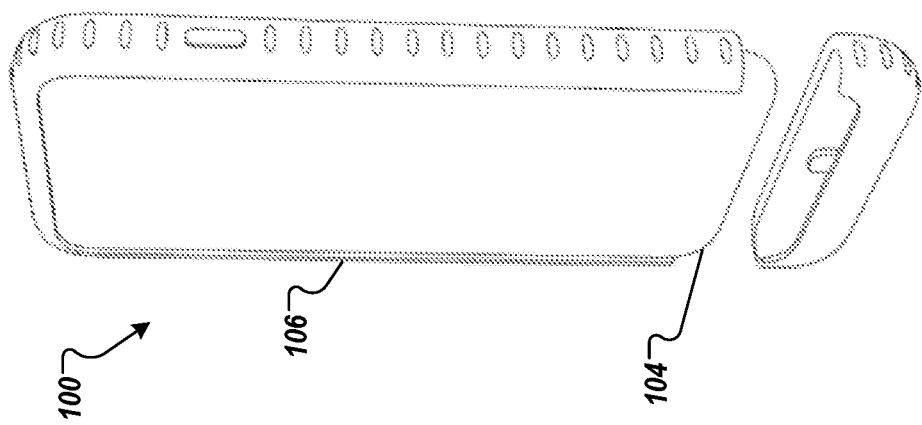
FIGS. 1A-1D depict an example intelligent accident detection (IAD) system in accordance with implementations of the present disclosure.
Figure 1A:
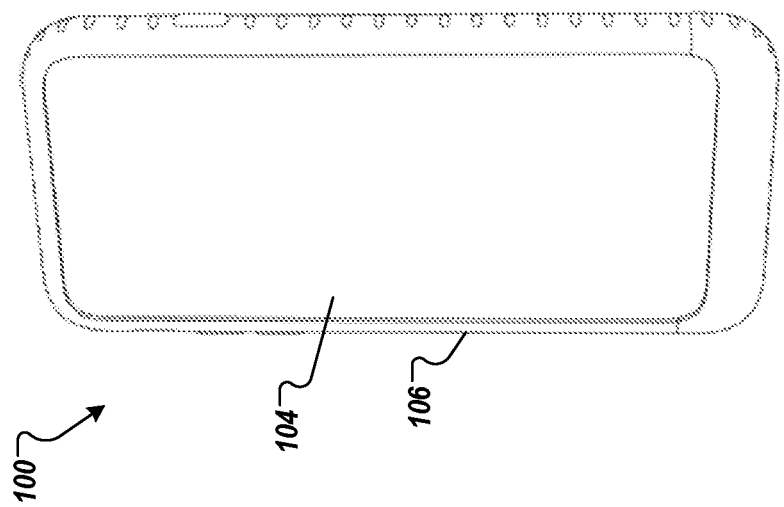

Implementations of the present disclosure are generally directed to an intelligent accident detection (IAD) platform that uses machine learning to build a custom user movement profile in order to accurately identify potential occurrences of accidents and dispatch the appropriate personnel. More particularly, implementations of the present disclosure are directed to an IAD platform that includes an IAD system having an alerting module that is in communication with a mobile device, the IAD system issuing an alert in response to one of manual activation of the alerting module and detected potential occurrence of an accident based on one or more machine-learning (ML) models. In some implementations, actions include providing movement data for processing using a ML model executed on a mobile device, the movement data being generated by the mobile device, receiving, from the ML model, a first prediction representative of an occurrence of a first accident, in response to receiving the first prediction, providing a first local alert on the mobile device, and selecting one of a first network and a second network for broadcasting a first remote alert to one or more end-points, if the first network is selected, the first remote alert is broadcast over the first network by the mobile device, and, if the second network is selected, the first remote alert is broadcast over the second network by an alerting module that is in communication with the mobile device.

To provide context for implementations of the present disclosure, and as introduced above humans can often be in solitary situations, in which no other humans or communication systems are available. For example, in many industries, lone workers operate in unstructured work environments. Example industries include agriculture, policing, oil and gas, utilities, and healthcare. In some circumstances, workers may face hazardous conditions. In the event of an accident, a worker may be unable to communicate with the outside world. For example, the worker may become incapacitated by an accident and be unable to operate a communication device (e.g., cellular phone). As another example, the worker may be in a remote location and out of communication range (e.g., remote from a cellular network).

Systems have been introduced in an effort to mitigate or avoid injuries in such circumstances. For example, so-called 'man-down' hardware products have been introduced, but are provided as stand-alone devices. Such products have disadvantages including the need for separate charging and compliance issues. As another example, phone-based 'man-down' applications (e.g., mobile apps) have been developed. However, such app-based systems are prone to false positives (e.g., alerting when an accident has not occurred), and are limited by the wireless technologies available on the host device (e.g., smartphone).

In view of the above context, implementations of the present disclosure provide an IAD platform including an IAD system having an alerting module that is in communication with a mobile device, the IAD system issuing an alert in response to one of manual activation of the alerting module and detected potential occurrence of an accident based on one or more ML models. As described in further detail herein, the IAD system of the present disclosure is part of the IAD platform that provides intelligent fall detection, which learns user behavior over time. That is, the one or more ML models can be tailored (e.g., retrained) based on feedback to adapt to particularities of individual users. In this manner, occurrences of false positives, if any, are reduced over time. Further, the alerting module includes built-in narrow band Internet-of-Things (NB-IOT) communication, which enables the IAD system to communicate in locations where traditional cellular technologies may not be available. The IAD system of the present disclosure provides a reliable, easy to use product that reduces response time and mitigates extent of injuries in the event of an accident. The IAD system increases the chance of survival when a life-threatening accident occurs.

FIGS. 1A-1D depict an example IAD system 100 in accordance with implementations of the present disclosure. The example IAD system 100 is part of an IAD platform that also includes an IAD mobile application and a cloud-based IAD system, as described in further detail herein. In the depicted example, the IAD system 100 includes an alerting module 102, a mobile device 104, and a mobile device case 106 in accordance with implementations of the present disclosure. In some examples, the mobile device 104 is provided as a handheld computer, a tablet computer, a personal digital assistant (PDA), a cellular telephone, a smartphone, a navigation device, or an appropriate combination of any two or more of these devices or other data processing devices.

In accordance with implementations of the present disclosure, the mobile device 104 is removably housed within the mobile device case 106. For example, the mobile device 104 can be assembled into the mobile device case 106 or removed from the mobile device case 106 (see, e.g., FIG. 1B). The mobile device case 106 protects the mobile device 104 from damage.

Figure 1D:
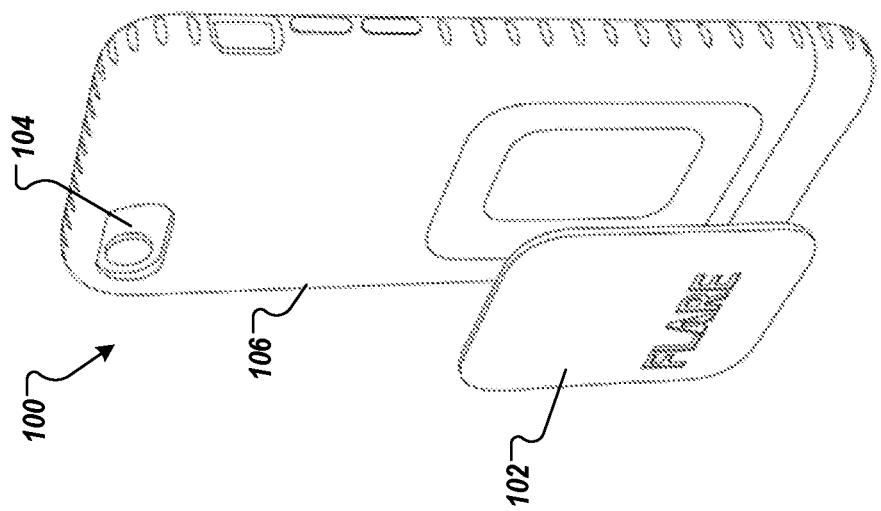
Figure 1C:
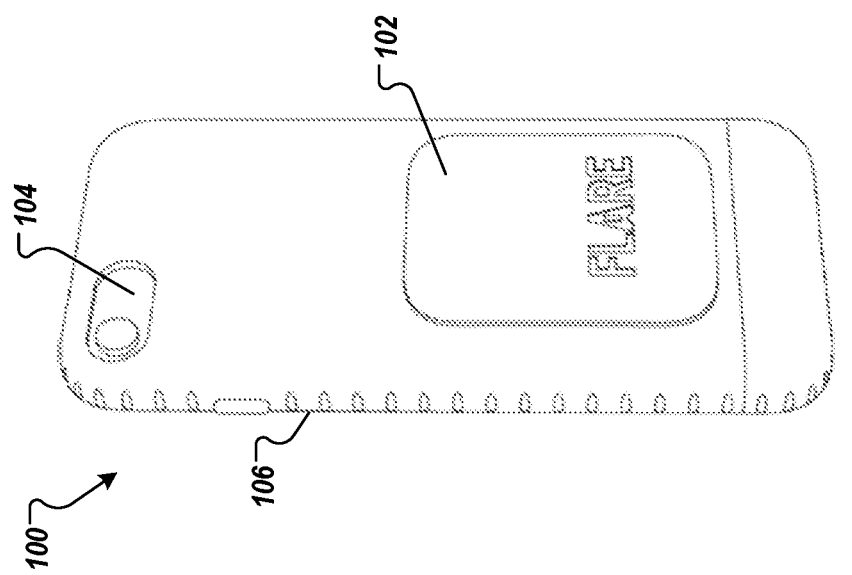

As depicted in FIGS. 1C and 1D, the alerting module 102 is fixed to the mobile device case 106. For example, the alerting module 102 can be attached to the mobile device case 106 or detached from the mobile device case 106. In some implementations, the mobile device case 106 includes a battery pack integrated therein. In some examples, the battery pack is used to charge the alerting module 102, while the alerting module 102 is attached to the mobile device case 106. In some examples, charging of the alerting module 102 can be achieved using wired and/or wireless charging. For example, mobile device case 106 can include wireless charging components that enable the battery pack to charge the alerting module 102. In some examples, the alerting module 102 is part of the mobile device case 106. That is, for example, the alerting module 102 and the mobile device case 106 can be provided as a single unit.

In accordance with implementations of the present disclosure, and as described in further detail herein, the alerting module 102 is in communication with the mobile device 104. In some examples, a wireless communication technology is implemented to provide wireless communication between the alerting module 102 and the mobile device 104. Example wireless communication technologies include, without limitation, Bluetooth (classic Bluetooth) and Bluetooth Low Energy (Bluetooth LE, BLE). Implementations of the present disclosure are described in further detail herein with reference to BLE, which uses frequency hopping wireless technology in a 2.4 GHz unlicensed radio band to interconnect devices, such as the alerting module 102 and the mobile device 104. It is contemplated, however, that implementations of the present disclosure can be realized using any appropriate wireless communication technology.

Figure 2:
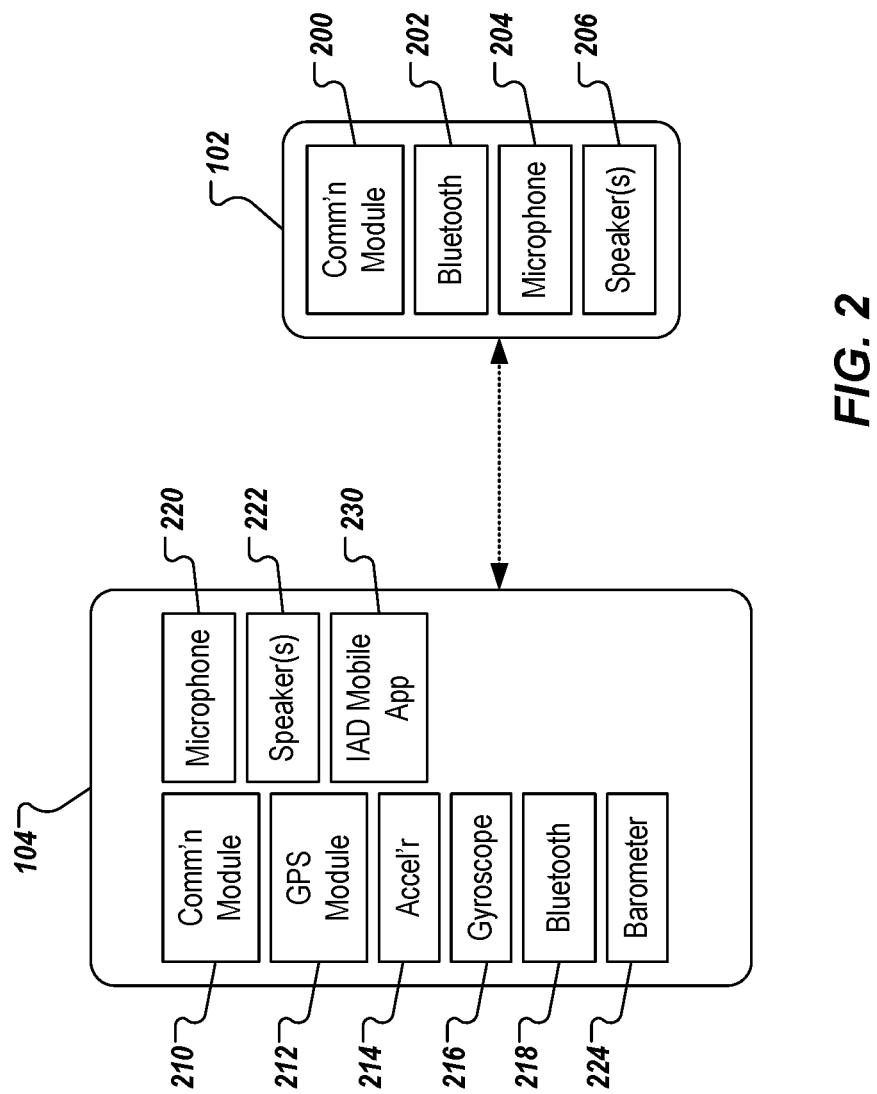
FIG. 2 depicts example components of the alerting module and the mobile device in accordance with implementations of the present disclosure.

FIG. 2 depicts example components of the alerting module 102 and the mobile device 104 in accordance with implementations of the present disclosure. In some examples, the alerting module 102 includes a communication module 200 and a Bluetooth module 202. In some examples, the alerting module 102 also includes a microphone 204 and one or more speakers 206. Although not depicted in FIG. 2, the alerting module 102 also includes one or more processors, memory, and a battery. The Bluetooth module 202 enables the alerting device 102 to wirelessly communicate with another device, such as the mobile device 104.

In accordance with implementations of the present disclosure, the communication module 200 enables the alerting module 102 to wirelessly communicate with one or more networks. In some implementations, the communication module 200 enables wireless communication using NB-IOT (also referred to as LTE CAT-NB1 and LTE-M2). NB-IOT can be described as a low power wide area network (LP-WAN) radio technology that can handle small amounts of two-way data transmission (e.g., maximum data-rate of a few 10 kbps) in an efficient, secure and reliable manner. Further, the low-frequency narrowband signals provided by NB-IOT have a long range and propagation characteristics that enable penetration through walls, metal conduits, and other structures.

By using NB-IOT, the alerting module 102 can achieve data transmission coverage in remote areas (e.g., rural areas) where signals of traditional networks do not reach (e.g., GSM/3G/4G networks). For example, even if the alerting module 102 is located in a barn, a basement, or a semi-indoor environment, NB-IOT signals transmitted from the alerting module 102 achieve better penetration as compared to traditional communication media (e.g., GSM/3G/4G). Further, network providers can readily implement NB-IOT as part of their networks, as NB-IOT only requires a software upgrade to existing LTE infrastructures, as opposed to a completely new hardware infrastructure network needing to be deployed. Further, power consumption of NB-IOT is relatively low, enabling the alerting module 102 to remain charged and active for extended periods of time. For example, NB-IOT offers an average 6 mW/byte in power consumption when transmitting data.

In some examples, the mobile device 104 includes a communication module 210, a global positioning system (GPS) module 212, an accelerometer 214, a gyroscope 216, a Bluetooth module 218, a microphone 220, and one or more speakers 222. In some examples, the mobile device 104 also includes a temperature and/or barometric pressure sensor 224. Although not depicted in FIG. 2, the mobile device 104 also includes one or more processors, memory, and a battery.

In some examples, the communication module 210 enables the mobile device 104 to wirelessly communicate with one or more networks. For example, the communication module 210 can enable the mobile device 104 to communicate with GSM/3G/4G networks. In some examples, the GPS module 212 enables a geographic location of the mobile device 104 to be determined. For example, the mobile device 104 can receive GPS signals (e.g., from GPS satellites) that are processed by the GPS module 212 to determine the geographic location of the mobile device 104. The Bluetooth module 218 enables the mobile device 104 to wirelessly communicate with another device, such as the alerting device 102.

In some implementations, the mobile device 104 executes an IAD mobile application 230. For example, the IAD mobile application 230 is downloaded to and installed on the mobile device 104 for execution thereon. As described in further detail herein, the IAD mobile application 230 executes functionality for monitoring activity of a user (e.g., a worker carrying the IAD system 100), and selectively generating alerts indicating occurrences of an accident.

In further detail, in operation, the IAD mobile application 230 executes on the mobile device 104, which is in wireless communication with the alerting module 102 (e.g., by BLE connection). For example, the user can initiate execution of the IAD mobile application 230 on the mobile device 104 (e.g., at the beginning of a work day, before performing some task). As the user moves, sensors of the mobile device 104 generate data representative of the movement. For example, the accelerometer 214 generates acceleration data representative of the movement. As another example, the gyroscope 216 generates data orientation data and/or rotation data representative of the movement. As another example, the GPS module 212 generates GPS data representative of the movement. In some examples, sensors can generate data representative of an environment, within which the mobile device 104 is located. For example, the temperature and/or barometric pressure sensor 224 can generate temperature data and/or pressure data.

In accordance with implementations of the present disclosure, the IAD mobile application 230 processes the movement data through a ML model to predict occurrence of an accident. More particularly, the movement data is provided as input to the ML model, which processes the movement data to generate a prediction. In some implementations, the prediction indicates an occurrence of an accident or a non-occurrence of an accident. For example, the prediction indicates the occurrence of an accident and, in response, alerting functionality is executed, as described in further detail herein. As another example, the prediction indicates non-occurrence of an accident and, in response, alerting functionality is not executed.

In some implementations, the ML model also provides a confidence value with the prediction, the confidence value representing a confidence in the accuracy of the prediction. In some implementations, the prediction indicates an occurrence of an accident with a confidence level and/or a non-occurrence of an accident with a confidence level. For example, the prediction indicates the occurrence of an accident and the confidence level is compared to a threshold confidence level. If the confidence level exceeds the threshold confidence level, alerting functionality is executed, as described in further detail herein. As another example, the prediction indicates non-occurrence of an accident and the confidence level is compared to a threshold confidence level. If the confidence level exceeds the threshold confidence level, alerting functionality is not executed.

In some implementations, multiple predictions can be provided as output of the ML model. For example, multiple predictions indicating occurrence of an accident can be provided as output, each prediction being directed to a severity of the accident. Example severities can include, without limitation, high, medium, and low. For example, the prediction indicates the occurrence of an accident and, in response, alerting functionality is executed based on the respective severity.

In accordance with implementations of the present disclosure, the ML model is provided from a cloud-based IAD system. Example ML models can include, without limitation, neural networks (e.g., a convolutional neural network (CNN), a recurrent neural network (RNN)), binary classification models, multiclass classification models, and regression models. It is contemplated that implementations of the present disclosure can be realized using any appropriate ML model.

In some examples, the cloud-based IAD system can be hosted by one or more servers and can train the ML model based on training data. In some examples, the training data is representative of movement associated with accidents and/or movement associated with non-accidents. In this manner, the ML model is trained to recognize potential occurrences, or potential non-occurrences, of accidents based on movement data. In some implementations, the ML model is provided with the IAD mobile application 230 for execution on the mobile device 104. For example, the cloud-based IAD system downloads the ML model to the mobile device 104 (e.g., with the IAD mobile application 230, as an update to the mobile application 230).

In some implementations, the training data initially used to train the ML model is provided as baseline data that is generally representative of occurrences and/or non-occurrences of accidents. Accordingly, the ML model can be initially provided as a baseline ML model that is trained to generally predict occurrences and/or non-occurrences of accidents. In some implementations, the baseline ML model is generic to industries. That is, the baseline ML model is trained using training data that is not specific to any particular industry. In this manner, the baseline ML model can be said to be industry-agnostic.

In some implementations, the training data initially used to train the ML model is provided as baseline data that is representative of occurrences and/or non-occurrences of accidents to a specific industry (e.g., farming, utilities, oil and gas). Accordingly, the ML model can be initially provided as a baseline ML model that is trained to predict occurrences and/or non-occurrences of accidents within a specific industry. That is, the baseline ML model is trained using training data that is specific to a particular industry. In this manner, the baseline ML model can be said to be industry-specific.

In accordance with implementations of the present disclosure, a baseline ML model is executed on the mobile device 104 to predict occurrences and/or non-occurrences of accidents as described herein. In some implementations, the baseline ML model is updated based on user-specific movement data to provide an updated ML model. That is, for example, as a user carries the IAD system 100, movement data is generated and is specific to the user. The user-specific movement data can be provided to the cloud-based IAD system (e.g., uploaded from the mobile device 104), which can execute re-training of the ML model based on the user-specific movement data to provide an updated ML model. The updated ML model can be downloaded back to the mobile device 104 to enable more accurate predictions for the particular user carrying the IAD system 100. This can be repeated, such that the updated ML model is periodically retrained on user-specific movement data to become increasingly more representative of the particular user. In this manner, false positives can be increasingly avoided, a false positive being a prediction by the ML model that an accident occurred (or did not occur), when an accident actually did not occur (or did occur).

As indicated above, the movement data generated by the mobile device 104 is representative of how the particular user moves in performing their tasks. Movement can significantly vary between users. For example, a first user might jump down from a vehicle (e.g., tractor), while a second user might climb down from a vehicle. In response to jumping movement of the first user, the baseline ML model might predict occurrence of an accident. The updated ML model executing in the IAD system 100 carried by the first user, however, might not predict occurrence of an accident in response to movement data representative of a jump of the first user from the vehicle. However, an updated ML model executing in the IAD system 100 carried by the second user, might predict occurrence of an accident in response to movement data representative of a fall of the second user from the vehicle.

In accordance with implementations of the present disclosure, an alert is selectively issued based on a prediction of the ML model (e.g., the baseline ML model, the updated ML model). For example, and as described above, if the prediction indicates the occurrence of an accident, alerting functionality is executed. In some implementations, the alerting functionality includes generating a local alert on the mobile device 104. In some examples, the local alert includes a visible alert (e.g., an alert UI displayed on the mobile device). In some examples, the local alert also includes an audible alert and/or a tactile alert. For example, an audible alert and/or a tactile alert can be generated in an effort to attract attention of the user carrying the IAD system 100.

Figure 3:
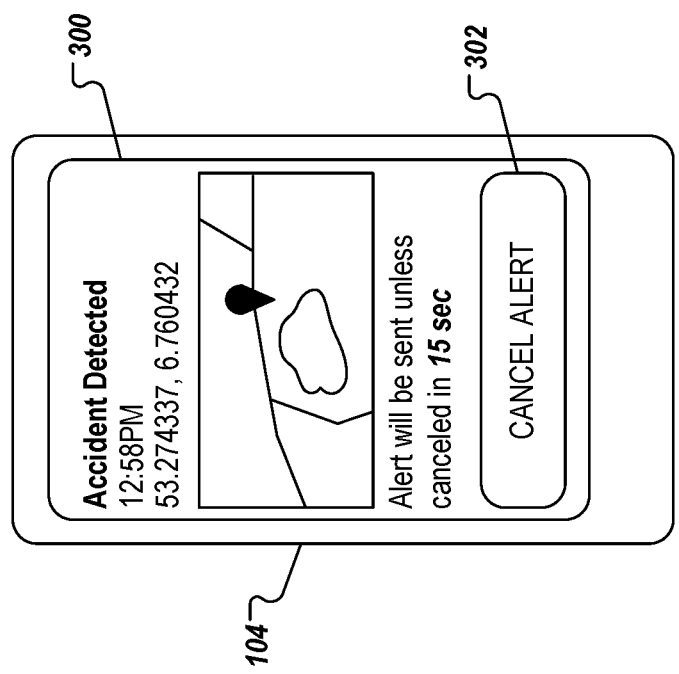
FIG. 3 depicts an example local alert on the mobile device of the IAD system in accordance with implementations of the present disclosure.

FIG. 3 depicts an example local alert 300 on the mobile device 104 of the IAD system 100 in accordance with implementations of the present disclosure. The local alert 300 is provided as a visible alert (e.g., an alert UI) that is displayed on the mobile device 104. In the depicted example, the local alert 300 indicates that an accident is detected and provides general information (e.g., time at which the accident was detected, GPS coordinates of the location of the IAD system 100, a map graphically depicting the location of the IAD system 100). In some implementations, the local alert 300 provides a countdown for broadcasting of a remote alert. For example, the local alert 300 can countdown from a first time (e.g., 30 seconds) to a second time (e.g., 0 seconds). In the depicted example, the local alert 300 includes an interface element 302 (e.g., a user-selectable button) that can be used to cancel broadcasting of the remote alert. For example, if the user selects the interface element 302 before the expiration of the countdown, broadcasting of the remote alert is cancelled. However, if the user does not select the interface element 302 before the expiration of the countdown, broadcasting of the remote alert is performed.

In accordance with implementations of the present disclosure, if a remote alert is to be broadcast, a channel for broadcasting the remote alert can be determined. Example channels include broadcasting over a cellular network (e.g., GSM/3G/4G) using the mobile device 104 and broadcasting to a NB-IOT network using the alerting module 102. In some implementations, it is determined whether the mobile device 104 is connected to a cellular network. For example, the IAD mobile application 130 can be programmed to check the network connectivity of the mobile device 104. If the mobile device 104 is connected to a cellular network, the remote alert can be broadcast over the cellular network using the mobile device 104. If the mobile device 104 is not connected to a cellular network, the remote alert can be broadcast by the alerting module 102 using NB-IOT.

In some implementations, different qualities of remote alerts can be broadcast based on the respective channels. For example, if the remote alert can be broadcast over the cellular network using the mobile device 104, the remote alert is provided as a data-rich alert. In some examples, a data-rich alert can include a relatively descriptive dataset that represents a broad range of details of the accident and circumstances thereof. For example, the data-rich alert can include, without limitation, a user identifier that uniquely identified the user carrying the IAD system 100, location information (e.g., GPS coordinates, an image depicting a map of the location), an IAD system identifier that uniquely identifies the IAD system 100 carried by the user, a description of the accident based on movement data (e.g., fall of approximately 10 ft. with rapid deceleration at impact), medical information associated with the user (e.g., medicinal allergies, known impairments), emergency contact information (e.g., contact information for member's of the user's family), and the like.

As another example, if the remote alert cannot be broadcast over the cellular network using the mobile device 104 and is broadcast using NB-IOT by the alerting module 102, the remote alert is provided as a data-lean alert. In some examples, a data-lean alert can include a relatively less descriptive dataset that represents a smaller range of details of the accident and circumstances thereof. For example, the data-lean alert can include location information (e.g., GPS coordinates). As another example, the data-lean alert can include location information and an identifier (e.g., of the user and/or of the IAD system).

In some implementations, if the remote alert is broadcast using NB-IOT, a more robust, data-rich alert can be queued for subsequent broadcasting over the cellular network. For example, if the mobile device 104 connects with a cellular network after the remote alert has been sent using NB-IOT, the data-rich alert is sent.

In some implementations, broadcasting of the remote alert can be to one or more end-points. Example end-points can include one or more devices (e.g., computers, servers, mobile devices) associated with respective entities. Example entities can include, without limitation, an enterprise that employs the user, for whom the remote alert is being broadcast, a co-worker of the user, for whom the remote alert is being broadcast, and one or more emergency responders (e.g., 911, ambulance, fire department). For example, an enterprise can receive a remote alert indicating occurrence of the accident and data representative of the accident (e.g., the user, the location, a severity), and, in response, can initiate one or more protocols for handling workplace accidents (e.g., contacting emergency services). As another example, an emergency responder can receive a remote alert indicating occurrence of the accident and data representative of the accident (e.g., the user, the location, a severity), and, in response, can initiate dispatch of emergency response personnel. As still another example, a co-worker can receive a remote alert indicating occurrence of the accident and data representative of the accident (e.g., the user, the location, a severity), and, in response, can initiate one or more protocols for handling workplace accidents (e.g., contacting the employer, contacting emergency services, go to the location of the accident to provide assistance).

In some implementations, the user can manually trigger an alert. For example, if an accident occurs and alerting is not initiated by the IAD system 100 (e.g., the ML model did not predict occurrence of the accident), the user can manually trigger an alert. In some implementations, the alerting module 102 includes a manual interface (e.g., a button, a switch) that the user can actuate to manually initiate alerting by the IAD system 100.

In accordance with implementations of the present disclosure, feedback is provided to the IAD platform to enhance accuracy of the ML models. In some examples, feedback includes a dataset of movement data, a prediction that was provided from the ML model based on the movement data, and a result. An example result includes a remote alert being sent (i.e., the ML model predicted an accident and the user did not manually cancel the remote alert). Another example result can include the user manually triggering the alert and the alert being sent (i.e., an accident occurred that was not predicted by the ML model (false negative)). Another example result can include the user manually cancelling the remote alert (i.e., the ML model predicted an accident that did not occur (false positive)). Another example result can include no accident being predicted by the ML model and the user did not manually trigger an alert (i.e., user activity occurring as intended without incident). In some implementations, the feedback is provided to the IAD platform that uses the feedback to update the ML model (e.g., re-train the ML model).

Figure 4:
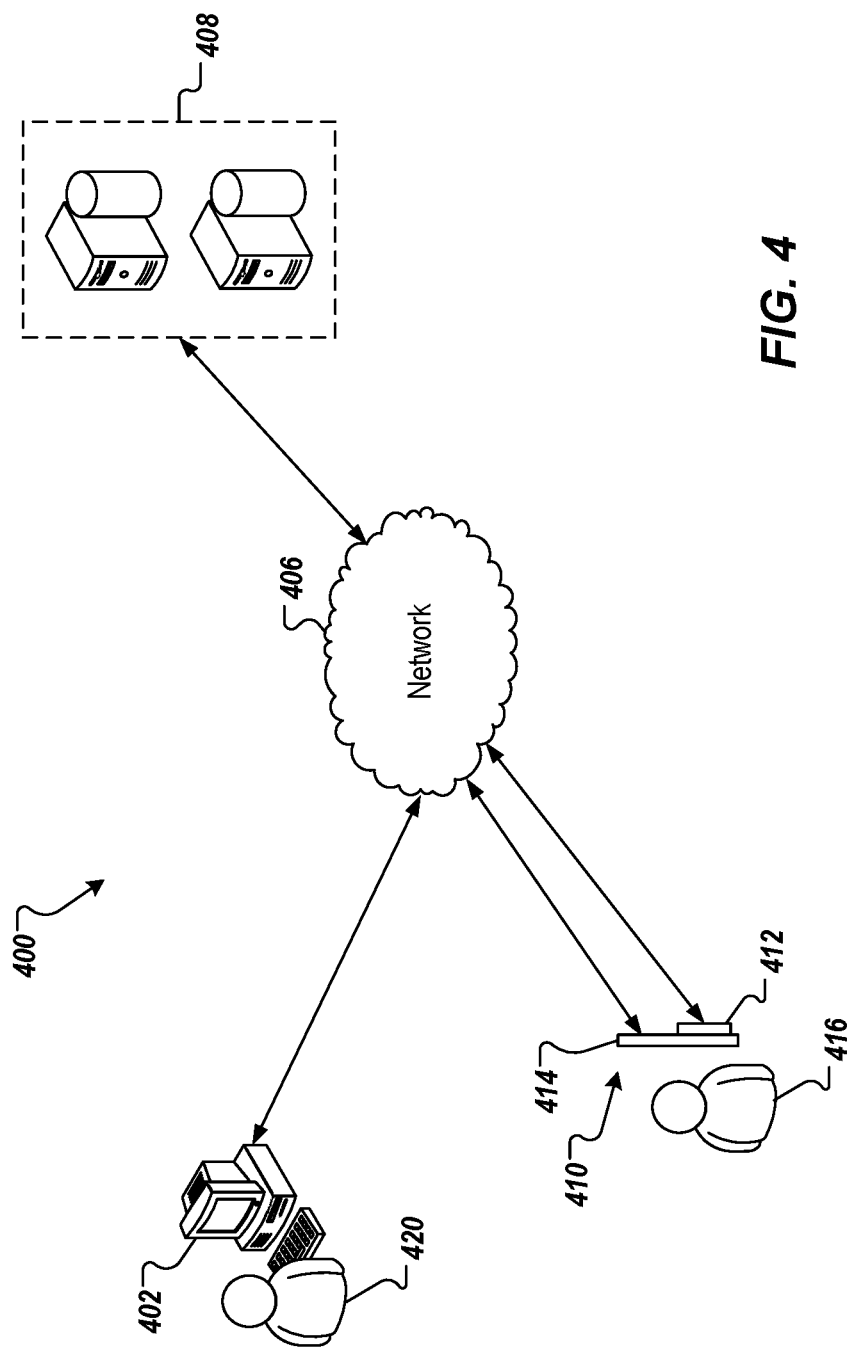
FIG. 4 depicts an example architecture in accordance with implementations of the present disclosure.

FIG. 4 depicts an example architecture 400 in accordance with implementations of the present disclosure. In the depicted example, the example architecture 400 includes a client device 402, a network 406, a server system 408, and an IAD system 410. The server system 408 includes one or more server devices and databases (e.g., processors, memory). In the depicted example, a user 412 interacts with the client device 402. For example, the user 412 can include emergency response personnel, who receives and responds to remote alerts through the client device 402.

In some examples, the client device 402 can communicate with the server system 408 over the network 406. In some examples, the client device 402 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 406 can include a large computer network, such as a local area network (LAN), a wide area network (WAN), the Internet, a cellular network, a telephone network (e.g., PSTN), an NB-IOT network, or an appropriate combination thereof connecting any number of communication devices, mobile computing devices, fixed computing devices and server systems.

In some implementations, the server system 408 includes at least one server and at least one data store. In the example of FIG. 4, the server system 408 is intended to represent various forms of servers including, but not limited to a web server, an application server, a proxy server, a network server, and/or a server pool. In general, server systems accept requests for application services and provides such services to any number of client devices (e.g., the client device 402 over the network 406). In accordance with implementations of the present disclosure, and as noted above, the server system 408 can host one or more cloud-based IAD applications, described herein.

The example architecture 400 also includes an IAD system 410 including an alerting module 412 and a mobile device 414. A user 416 carries the IAD system 410. For example, the user 416 can be a worker (e.g., employee of an enterprise) that periodically travels to remote locations, or otherwise performs tasks in unstructured environments. As described herein with reference to the IAD system 100 of FIGS. 1A-1D, the IAD system 410 can monitor movement of the user 416 and selectively trigger alerts in response to detecting occurrence of an accident by an ML model, or manual triggering by the user 416. In some examples, a remote alert is broadcast by the alerting module 412 using NB-IOT (e.g., if the mobile device 414 is not connected to a cellular network (e.g., of the network 406). In some examples, a remote alert is broadcast by the mobile device 414 using a cellular network (e.g., of the network 406).

Figure 5:
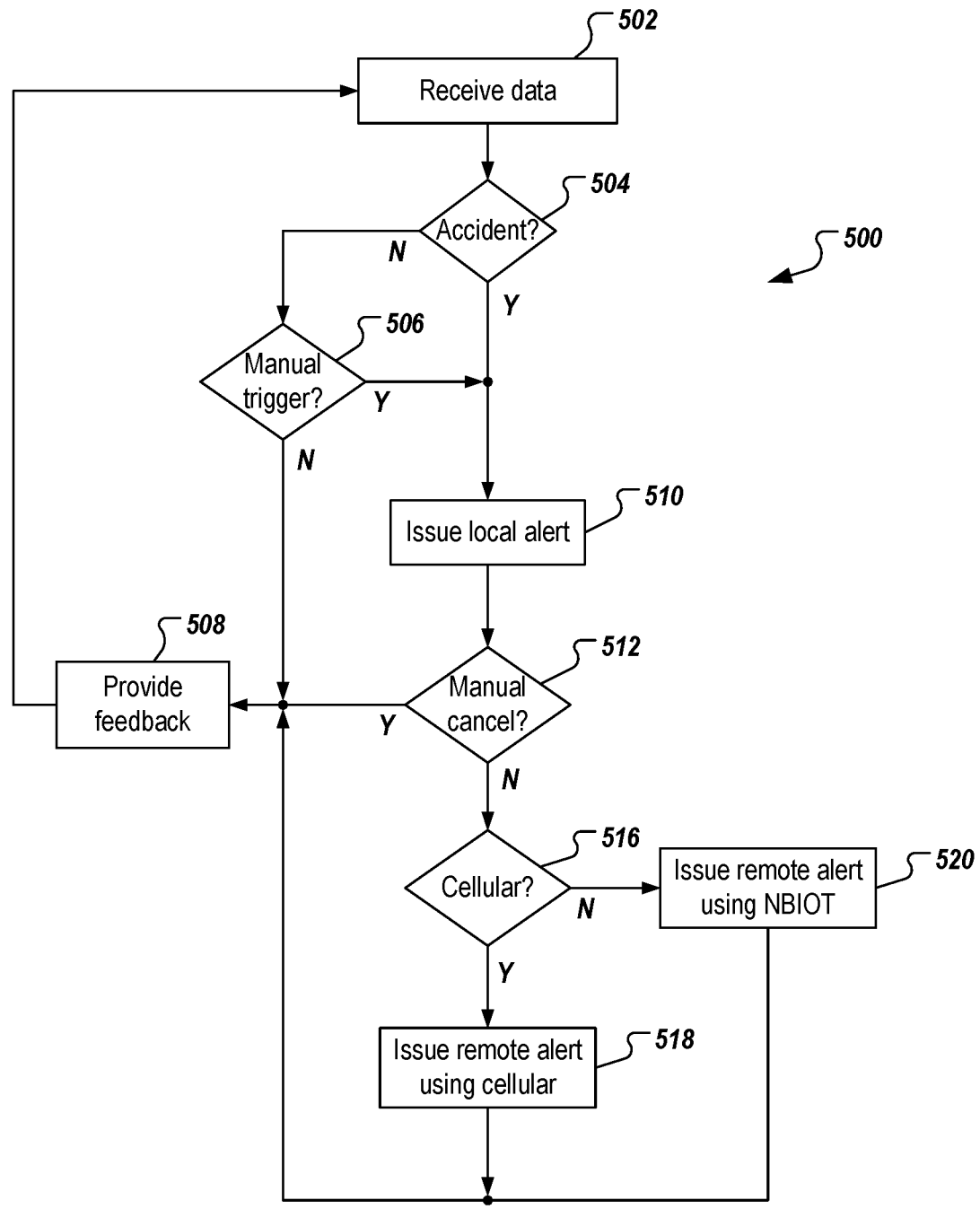
FIG. 5 depicts an example process that can be executed in implementations of the present disclosure.

FIG. 5 depicts an example process 500 that can be executed in implementations of the present disclosure. In some implementations, the example process 500 may be performed using one or more computer-executable programs executed using one or more computing devices.

Data is received (502). For example, the IAD mobile application 230 executing on the mobile device 104 receives data from one or more sensors of the mobile device 104. Example data includes movement data including, without limitation, GPS data, accelerometer data, gyroscope data, and the like, as described herein. It is determined whether an accident has occurred (504). For example, the IAD mobile application 230 inputs the data to a ML model, which provides a prediction as to an occurrence of an accident and/or a non-occurrence of an accident as described herein. For example, the prediction indicates the occurrence of an accident and, in response, it is determined that an accident has occurred. As another example, the prediction indicates non-occurrence of an accident and, in response, it is determined that an accident has not occurred. In some examples, and as described herein, the ML model also provides a confidence value with the prediction, the confidence value representing a confidence in the accuracy of the prediction. In some examples, the prediction indicates the occurrence of an accident and the confidence level is compared to a threshold confidence level. If the confidence level exceeds the threshold confidence level, it is determined that an accident has occurred. As another example, the prediction indicates non-occurrence of an accident and the confidence level is compared to a threshold confidence level. If the confidence level exceeds the threshold confidence level, it is determined that an accident has not occurred.

If an accident has not occurred, it is determined whether an alert has been manually triggered (506). For example, if the user manually triggers an alert (e.g., by actuating a manual interface of the alerting module 102), a signal is provided to the IAD mobile application 130 executed by the mobile device 102. If it is determined that an alert has not been manually triggered, feedback is provided (508). For example, feedback includes a dataset of movement data, a prediction that was provided from the ML model based on the movement data, and a result. An example result can include no accident being predicted by the ML model and the user did not manually trigger an alert (i.e., user activity occurring as intended without incident). In some implementations, the feedback is provided to the IAD platform that uses the feedback to update the ML model (e.g., re-train the ML model).

If it is determined that an accident has occurred, or that an alert has been manually triggered, a local alert is issued (510). For example, and as described above with reference to FIG. 3, a visible alert (e.g., an alert UI) is displayed on the mobile device 104. In some examples, the local alert also includes an audible alert and/or a tactile alert. It is determined whether the alert has been manually cancelled (512). For example, and as described herein, the local alert 300 includes an interface element 302 (e.g., a user-selectable button) that can be used to cancel broadcasting of the remote alert. For example, if the user selects the interface element 302 before the expiration of a countdown, broadcasting of the remote alert is cancelled. However, if the user does not select the interface element 302 before the expiration of the countdown, broadcasting of the remote alert is performed. If the alert has been manually cancelled, feedback is provided (508). For example, the feedback can include a result indicating that the alert was automatically triggered by the ML model, but the user manually canceled the remote alert (i.e., the ML model predicted an accident that did not occur (false positive)). As another example, the feedback can include a result indicating that the alert was manually triggered by the user, but the user manually canceled the remote alert (e.g., the manual triggering was inadvertent, or the user changed their mind as to an emergency).

If the alert has not been manually cancelled, it is determined whether a cellular connection is available (516). For example, the IAD mobile application 130 can be programmed to check the network connectivity of the mobile device 104. If the mobile device 104 is connected to a cellular network, the remote alert can be broadcast over the cellular network using the mobile device 104. If the mobile device 104 is not connected to a cellular network, the remote alert can be broadcast by the alerting module 102 using NB-IOT. If a cellular connection is available, a remote alert is issued using a cellular network (518), and feedback is provided (508). If a cellular connection is not available, a remote alert is issued using NB-IOT (520), and feedback is provided (508). For example, the feedback can include a result indicating a remote alert being sent (i.e., the ML model predicted an accident and the user did not manually cancel the remote alert). As another example, the feedback can include a result indicating that the user manually triggered the alert and the alert was sent (i.e., an accident occurred that was not predicted by the ML model (false negative)).

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for selectively issuing alerts from an accident detection system, the method comprising:
   providing movement data for processing using a machine-learning (ML) model executed on a mobile device, the movement data being generated by the mobile device;
   receiving, from the ML model, a first prediction representative of an occurrence of a first accident;
   in response to receiving the first prediction, providing a first local alert on the mobile device; and
   selecting one of a first network and a second network for broadcasting a first remote alert to one or more end-points, if the first network is selected, the first remote alert is broadcast over the first network by the mobile device, and, if the second network is selected, the first remote alert is broadcast over the second network by an alerting module that is in communication with the mobile device and that is mounted to a mobile device case that encases the mobile device.

2. The method of claim 1, wherein the second network is selected in response to determining that the mobile device is not connected to the first network.

3. The method of claim 1, wherein the first network comprises a cellular communication network.

4. The method of claim 1, wherein the second network comprises a network using narrow band Internet-of-Things (NB-IOT) technology.

5. The method of claim 1, wherein the mobile device case comprises a battery for charging the alerting module.

6. The method of claim 1, wherein selecting one of a first network and a second network is performed in response to determining that an alert is not cancelled before expiration of a countdown.

7. The method of claim 1, further comprising:
   receiving, from the ML model, a second prediction representative of a non-occurrence of an accident;
   receiving, from the alerting module, a signal indicating manual triggering of an alert; and
   at least partially in response to receiving the signal, selecting one of a first network and a second network for broadcasting a second remote alert to the one or more end-points, if the first network is selected, the second remote alert is broadcast over the first network by the mobile device, and, if the second network is selected, the second remote alert is broadcast over the second network by the alerting module.

8. The method of claim 1, further comprising receiving, by the mobile device, an updated ML model, the updated ML model being at least partially provided based on feedback data received from the mobile device.

9. The method of claim 1, wherein the alerting module is in communication with the mobile device using a wireless connection.

10. The method of claim 1, wherein the movement data comprises one or more of location data, accelerometer data, and gyroscope data.

11. An accident detection system, comprising:
an alerting module that is in communication with a mobile device, the mobile device comprising a computer-readable storage device coupled to one or more processors and having instructions stored thereon which, when executed by the one or more processors, cause the one or more processors to perform operations comprising:
providing movement data for processing using a machine-learning (ML) model executed on the mobile device, the movement data being generated by the mobile device;
receiving, from the ML model, a first prediction representative of an occurrence of a first accident;
in response to receiving the first prediction, providing a first local alert on the mobile device; and
selecting one of a first network and a second network for broadcasting a first remote alert to one or more end-points, if the first network is selected, the first remote alert is broadcast over the first network by the mobile device, and, if the second network is selected, the first remote alert is broadcast over the second network by an alerting module that is in communication with the mobile device and that is mounted to a mobile device case that encases the mobile device.

12. The accident detection system of claim 11, wherein the second network is selected in response to determining that the mobile device is not connected to the first network.

13. The accident detection system of claim 11, wherein the first network comprises a cellular communication network.

14. The accident detection system of claim 11, wherein the second network comprises a network using narrow band Internet-of-Things (NB-IOT) technology.

15. The accident detection system of claim 11, wherein the mobile device case comprises a battery for charging the alerting module.

16. The accident detection system of claim 11, wherein selecting one of a first network and a second network is performed in response to determining that an alert is not cancelled before expiration of a countdown.

17. The accident detection system of claim 11, wherein operations further comprise:
receiving, from the ML model, a second prediction representative of a non-occurrence of an accident;
receiving, from the alerting module, a signal indicating manual triggering of an alert; and
at least partially in response to receiving the signal, selecting one of a first network and a second network for broadcasting a second remote alert to the one or more end-points, if the first network is selected, the second remote alert is broadcast over the first network by the mobile device, and, if the second network is selected, the second remote alert is broadcast over the second network by the alerting module.

18. The accident detection system of claim 11, wherein operations further comprise receiving, by the mobile device, an updated ML model, the updated ML model being at least partially provided based on feedback data received from the mobile device.

19. The accident detection system of claim 11, wherein the alerting module is in communication with the mobile device using a wireless Bluetooth connection.

20. The accident detection system of claim 11, wherein the movement data comprises one or more of location data, accelerometer data, and gyroscope data.

21. One or more non-transitory computer-readable storage media coupled to one or more processors and having instructions stored thereon which, when executed by the one or more processors, cause the one or more processors to perform operations comprising:
providing movement data for processing using a machine-learning (ML) model executed on a mobile device, the movement data being generated by the mobile device;
receiving, from the ML model, a first prediction representative of an occurrence of a first accident;
in response to receiving the first prediction, providing a first local alert on the mobile device; and
selecting one of a first network and a second network for broadcasting a first remote alert to one or more end-points, if the first network is selected, the first remote alert is broadcast over the first network by the mobile device, and, if the second network is selected, the first remote alert is broadcast over the second network by an alerting module that is in communication with the mobile device and that is mounted to a mobile device case that encases the mobile device.

22. The one or more non-transitory computer-readable storage media of claim 21, wherein the second network is selected in response to determining that the mobile device is not connected to the first network.

23. The one or more non-transitory computer-readable storage media of claim 21, wherein the first network comprises a cellular communication network.

24. The one or more non-transitory computer-readable storage media of claim 21, wherein the second network comprises a network using narrow band Internet-of-Things (NB-IOT) technology.

25. The one or more non-transitory computer-readable storage media of claim 21, wherein the mobile device case comprises a battery for charging the alerting module.

26. The one or more non-transitory computer-readable storage media of claim 21, wherein selecting one of a first network and a second network is performed in response to determining that an alert is not cancelled before expiration of a countdown.

27. The one or more non-transitory computer-readable storage media of claim 21, wherein operations further comprise:
receiving, from the ML model, a second prediction representative of a non-occurrence of an accident;
receiving, from the alerting module, a signal indicating manual triggering of an alert; and
at least partially in response to receiving the signal, selecting one of a first network and a second network for broadcasting a second remote alert to the one or more end-points, if the first network is selected, the second remote alert is broadcast over the first network by the mobile device, and, if the second network is selected, the second remote alert is broadcast over the second network by the alerting module.

28. The one or more non-transitory computer-readable storage media of claim 21, wherein operations further comprise receiving, by the mobile device, an updated ML model, the updated ML model being at least partially provided based on feedback data received from the mobile device.

29. The one or more non-transitory computer-readable storage media of claim 21, wherein the alerting module is in communication with the mobile device using a wireless connection.

30. The one or more non-transitory computer-readable storage media of claim 21, wherein the movement data comprises one or more of location data, accelerometer data, and gyroscope data.

31. A computer-implemented method for selectively issuing alerts from an accident detection system, the method comprising:
  providing movement data for processing using a machine-learning (ML) model executed on a mobile device, the movement data being generated by the mobile device;
  receiving, from the ML model, a first prediction representative of an occurrence of a first accident;
  in response to receiving the first prediction, providing a first local alert on the mobile device; and
  in response to determining that an alert is not cancelled before expiration of a countdown, selecting one of a first network and a second network for broadcasting a first remote alert to one or more end-points, if the first network is selected, the first remote alert is broadcast over the first network by the mobile device, and, if the second network is selected, the first remote alert is broadcast over the second network by an alerting module that is in communication with the mobile device.

32. A computer-implemented method for selectively issuing alerts from an accident detection system, the method comprising:
  providing movement data for processing using a machine-learning (ML) model executed on a mobile device, the movement data being generated by the mobile device;
  receiving, from the ML model, a first prediction representative of an occurrence of a first accident;
  in response to receiving the first prediction, providing a first local alert on the mobile device;
  selecting one of a first network and a second network for broadcasting a first remote alert to one or more end-points, if the first network is selected, the first remote alert is broadcast over the first network by the mobile device, and, if the second network is selected, the first remote alert is broadcast over the second network by an alerting module that is in communication with the mobile device;
  receiving, from the ML model, a second prediction representative of a non-occurrence of an accident;
  receiving, from the alerting module, a signal indicating manual triggering of an alert; and
  at least partially in response to receiving the signal, selecting one of a first network and a second network for broadcasting a second remote alert to the one or more end-points, if the first network is selected, the second remote alert is broadcast over the first network by the mobile device, and, if the second network is selected, the second remote alert is broadcast over the second network by the alerting module.

33. A computer-implemented method for selectively issuing alerts from an accident detection system, the method comprising:
  providing movement data for processing using a machine-learning (ML) model executed on a mobile device, the movement data being generated by the mobile device;
  receiving, from the ML model, a first prediction representative of an occurrence of a first accident;
  in response to receiving the first prediction, providing a first local alert on the mobile device; and
  selecting one of a first network and a second network for broadcasting a first remote alert to one or more end-points, if the first network is selected, the first remote alert is broadcast over the first network by the mobile device, and, if the second network is selected, the first remote alert is broadcast over the second network by an alerting module that is in communication with the mobile device using a wireless connection.

\* \* \* \* \*

UNITED STATES PATENT AND TRADEMARK OFFICE
CERTIFICATE OF CORRECTION

| | | |
|---|---|---|
| PATENT NO. | : 10,869,180 B1 | Page 1 of 1 |
| APPLICATION NO. | : 16/597991 | |
| DATED | : December 15, 2020 | |
| INVENTOR(S) | : John Moriarty et al. | |

It is certified that error appears in the above-identified patent and that said Letters Patent is hereby corrected as shown below:

In the Claims

Claim 19, Column 16, Line 8, delete "wireless Bluetooth" and insert -- wireless --, therefor.

Signed and Sealed this
Thirteenth Day of February, 2024

Katherine Kelly Vidal
*Director of the United States Patent and Trademark Office*